Patented July 18, 1939

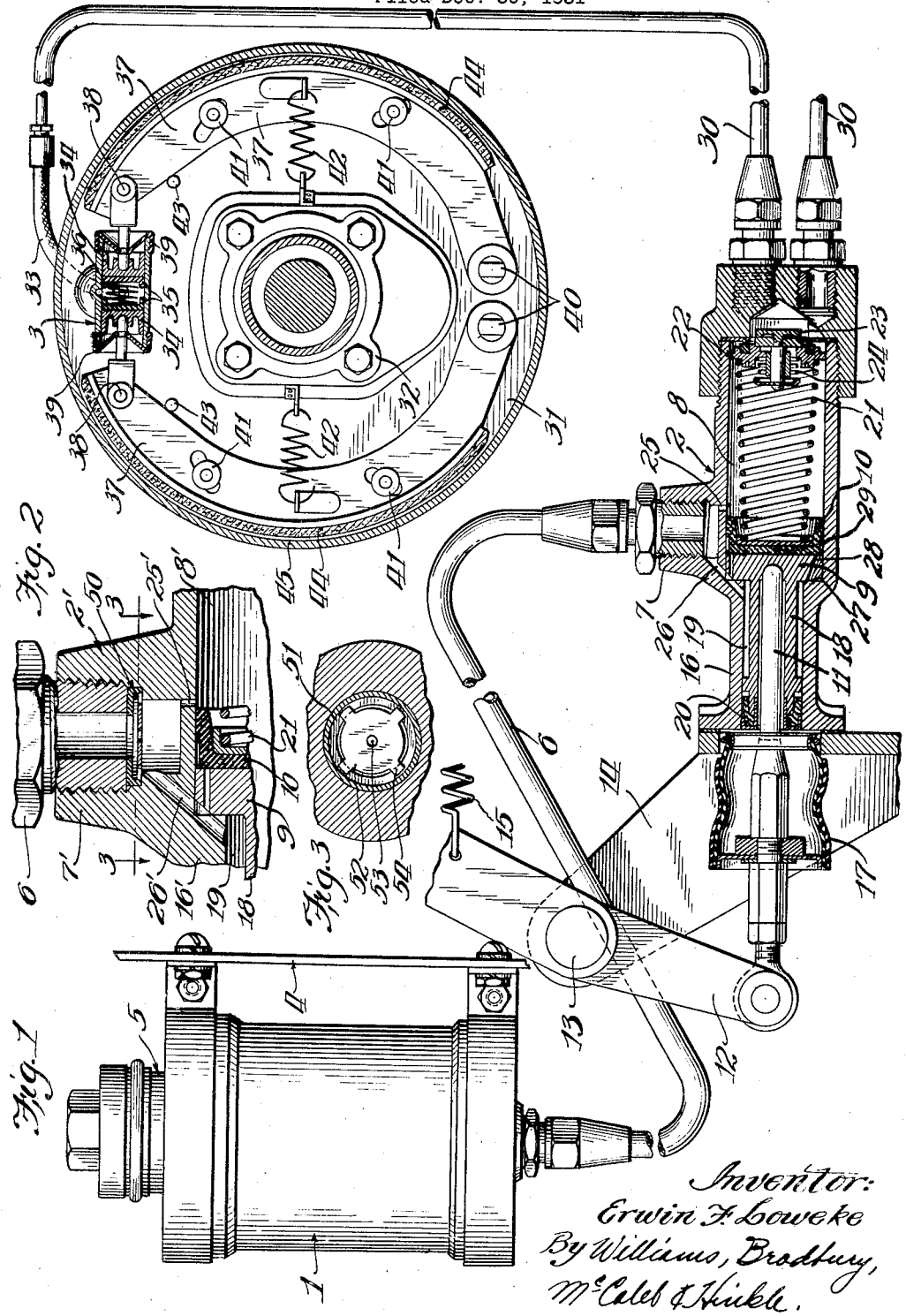

2,166,724

UNITED STATES PATENT OFFICE 2,166,724

HYDRAULIC BRAKE

Erwin F. Loweke, Detroit, Mich., assignor to Hydraulic Brake Company, Detroit, Mich., a corporation of California Application December 30, 1931, Serial No. 583,875

9 Claims. (Cl. 60—54.6)

My invention relates to hydraulic brakes, and is particularly concerned with the means for insuring exclusion of air from the operating parts of hydraulic brake systems. As will be readily appreciated, it is of the utmost importance that air and other gases be excluded from the operating parts of hydraulic brake systems if the brake system is to be maintained in proper operating condition. One of the commonest points for air to enter a hydraulic brake system is in rear of the master cylinder and one of the objects of my invention is to improve the construction of the brake system at this point so as to eliminate any possibility of air leaking into the system at this point.

Another object of my invention is to accomplish the foregoing result in the simplest and most economical manner.

Another object is to provide a fluid seal for hydraulic brake systems which is always maintained under super-atmospheric pressure.

Another object is to reduce to a minimum the area through which air might gain access to the system.

Other objects and advantages will be apparent as the description proceeds.

In the drawing,

Fig. 1 is a view of the principal elements of a hydraulic brake system, showing certain parts in section better to illustrate the construction thereof;

Fig. 2 is a fragmentary view in section showing a modified form of my invention; and Fig. 3 is a section taken on the line 3—3 of Fig. 2.

Referring to Fig. 1 of the drawing, I have illustrated a hydraulic brake system as comprising a reservoir 1, a master cylinder 2, and a motor cylinder 3. The reservoir 1 is commonly mounted on the dash 4 of a motor vehicle and is provided with either a small open vent or more preferably, valve mechanism such as indicated at 5, to maintain the reservoir under substantially atmospheric pressure. The valve mechanism 5 is not disclosed in full herein, since this valve mechanism is fully illustrated and described in the application of Clarence V. Gardner, Serial No. 535,316 filed May 6, 1931, now Patent No. 1,389,357.

The reservoir 1 is connected by a pipe 6 with a boss 7 integral with the master cylinder 2. The master cylinder 2 comprises a compression cylinder 8 of relatively large diameter, in which is reciprocably mounted a piston 9, adjacent the forward face of which is located a rubber cup 10. The piston 9 and cup 10 are advanced by a pin 11 which simply rests in a socket in the rear face of the piston 9, and which is separable therefrom.

The other end of the pin 11 is pivotally connected to an operating lever 12 pivoted at 13 to a bracket 14 which is affixed to the frame of the vehicle in any suitable manner. The lever 12 is actuated in brake applying direction by the hand or foot of the driver or by suitable power means where so desired. This lever 12 is returned to normal position by a suitable spring which is indicated at 15.

The rear end of the master cylinder is provided with an integral tubular extension 16 which may be suitably attached either to the bracket 14 or directly to the vehicle frame. A flexible boot 17 of leather, rubber or other suitable material closes the end of this extension against the entry of dirt or moisture. The piston 9 is provided with a reduced rearward extension 18 which reciprocates in the tubular extension 16. The extension 18 provides an annular chamber 19 which is filled with liquid and which serves as a liquid seal for preventing the entry of air into the brake system. The extreme rear of the extension 18 carries a flexible packing 20.

The cup 10 is held against the forward face of the piston 9 by a spring 21 which functions to return the piston and cup to retracted position at the termination of brake application, and which also functions to hold against its seat a return valve 22 located at the discharge end of the compression cylinder 8. The return valve 22 carries a centrally located outlet valve 23 which is lightly held in closed position by a spring 24. A small port 25 connects the compression cylinder 8 with the conduit 6 when the piston 9 and cup 10 are in the retracted position as shown in Fig. 1 of the drawing.

A second port 26 of somewhat larger diameter than the port 25 connects the pipe 6 with the chamber 19. The rear edge of the piston 9 is chamfered as indicated at 27, thereby providing a small annular space at the extreme rear end of the part which forms the compression cylinder 8, and the port 26 also connects with this annular space. The piston 9 is provided with passages 28 which permit flow of fluid therethrough during the return stroke of the piston. During the return stroke of the piston the forward edge of the cup 10 collapses to permit flow of fluid there past, and the base portion of the cup is provided with axial grooves 29 which facilitate flow of fluid past the heavy base of the cup during the return stroke of the piston.

Fluid discharged from the compression cylinder 8 flows through a conduit 30 to the motor cylinders 3, which are most commonly located at the vehicle wheels, although these motor cylinders and attendant mechanisms are equally capable of use on the propeller shaft of the vehicle, or on the axles at points spaced from the vehicle wheels or in any other suitable location on the vehicle chassis.

In the drawing I have illustrated the motor cylinder 3 as secured to a pan 31 attached to the axle housing 32. I provide a section of flexible conduit 33 to accommodate the relative motion between the motor cylinder 3 and the master cylinder 2. The motor cylinder 3 has opposed pistons 34, each provided with a rubber cup 35. The cups 35 are held against the piston faces by a relatively light spring 36. Each piston 34 is connected with a brake shoe 37 by a pin 38 which simply rests in a socket in the back of a piston 34. The ends of the motor cylinder 3 are closed against entry of dirt and water by flexible caps 39 of rubber or other suitable material.

The brake shoes 37 are mounted on pins 40 affixed to the pan 31. Each shoe is provided with suitable guides 41 and a relatively strong retractile spring 42 which holds its shoe against a suitable stop indicated at 43. Each shoe is provided with brake lining 44 for engaging the brake drum 45 which is attached to the vehicle wheel or other rotating element.

The operation of this embodiment of my invention is as follows. In the position of the parts shown in the drawing, which is the normal position of these parts, the reservoir is partly filled with fluid and the cylinders 3 and 8, conduits 6 and 30 and sealing chamber 19, are filled with fluid. The fluid in the conduits 30 and motor cylinders 3 is under a pressure approximating nine pounds above atmospheric pressure, which is maintained by the return valve 22. The fluid in the compression cylinder 8 and chamber 19 is maintained under a pressure supply above atmospheric pressure due to the elevation of the reservoir 1, which is usually located approximately two feet above the master cylinder 2, so that the pressure in the compression cylinder and fluid seal approximate one pound above atmospheric pressure. When the lever 12 is moved to apply the brakes, the cup 10 first moves to a position to close the port 25, after which the pressure in the compression cylinder 8 increases as the cup 10 and piston 9 advance. The advance of the cup 10 and piston 9 forces fluid through the outlet valve 23 and into the conduits 30, whence fluid is forced into the motor cylinders 3. This spreads the motor pistons 34 and applies the brake shoes 37 against the brake drum 45.

When the force exerted on the lever 12 is released, the spring 15 returns this lever to normal position independently of the piston 9. The outlet valve 23 closes and the spring 21 returns the piston 9 and cup 10 to the position shown in the drawing.

The return movement of the piston 10 and cup 9 is faster than the return of fluid from the motor cylinders, since the return valve 22 and the long and small diameter conduits 30 retard the return flow of fluid from the motor cylinders to the compression cylinder. Thus a vacuum or condition of sub-atmospheric pressure is created in the compression cylinder during the return stroke of the piston 9 and cup 10, and during this return movement fluid flows through the passages 26 in the piston 9 and past the cup 10 and thence into the compression cylinder 8.

Since the bore of the compression cylinder 8 is larger than the bore of the extension 18, a certain amount of fluid must be displaced from behind the piston 9 during its return stroke. Part of this fluid by-passes the piston and cup, as previously explained, and thus finds its way into the compression cylinder 8. The remainder of this fluid is forced back into the pipe 6 through ports 25 and 26. Both of these ports are small and retard the return flow of this fluid so that a pressure is created on the fluid in the chamber 19. This pressure in the sealing chamber 19 absolutely prevents the entry of any air past the gasket 20 during the return stroke of the piston.

When the piston 9 and cup 10 reach their fully retracted position, the port 25 establishes communication between the reservoir and the compression cylinder 8. There is now an excess of fluid in the compression cylinder, conduits 30 and motor cylinders 3 and as the pistons 34 of the motor cylinders complete their return strokes, this excess of fluid is discharged through the port 25, and carries with it any air which may have crept into the motor cylinders, conduits 30 and compression cylinder 8.

In the modification shown in Figs. 2 and 3, the boss 7' of the master cylinder 2' provides a shoulder on which is located a valve mechanism 50. This valve mechanism 50 comprises a seat member 51 and a disk 52 provided with a small central opening 53 and guide fingers 54. This valve means 50 is interposed between the conduit 6 leading to the reservoir and the port 25' which communicates with the compression cylinder 8', which is identical with the compression cylinder 8 previously described. In this compression cylinder 8' are located the piston 9, cup 10, spring 21, etc., all as previously described.

The valve mechanism 50 is also interposed between the conduit 6 and the port 26' which communicates with the chamber 19 formed in the periphery of the rearward extension 18 of the piston 9. In this embodiment the port 26' may be made larger than the port 26 of the previous embodiment shown in Fig. 1. The valve disk 52 is normally held in the position shown in Fig. 2 by the force of gravity. In this position the fingers 54 rest on the shoulder formed in the boss 2' and fluid may readily pass from the reservoir around the edges of the valve disk 52 and thence through ports 25' and 26'.

During the return stroke of the piston the fluid behind the piston rushes up through the port 26' and lifts the valve disk 52 against its seat 50, thereby restricting the passageway leading back to the reservoir to the small opening 53 through the valve disk. This restriction on the return of fluid to the reservoir creates a super-atmospheric pressure in the chamber 19 and maintains this pressure throughout the return stroke of the piston.

As in the previous embodiment, part of the fluid behind the piston by-passes the piston and cup and thus reaches that part of the compression cylinder in front of the cup 10. As soon as the piston has completed its return stroke the disk 52 drops to the position shown in Fig. 2.

In this embodiment, the port 26' may be made relatively large so as to provide free communication between the reservoir and the rear of the piston during the forward motion of the piston and thus prevent the creation of a vacuum in the rear of the piston during its forward motion.

The passageway 53 through the valve disk 52 is preferably made larger than the port 25', but considerably smaller than the port 26'.

While I have illustrated and described two embodiments of my invention, it is to be understood that my invention is capable of assuming various other forms and that my invention is limited solely by the scope of the following claims.

I claim:

1. In brake mechanism of the class described, the combination of a compression cylinder having a discharge outlet, a piston in said compression cylinder, a spring for returning said piston, a tubular extension in rear of said compression cylinder, said tubular extension having a bore less than that of the compression cylinder and forming a stop for said piston, a sealing part integral with said piston and extending into said tubular extension, said sealing part provided with an annular chamber cooperating with the bore of said extension, a reservoir communicating with said compression cylinder and chamber, a restriction valve between said reservoir and chamber cooperating with said piston to create pressure in said chamber during the return stroke of said piston, and a cup washer associated with said piston to permit flow of fluid from said extension into said cylinder.

2. In apparatus of the class described, the combination of a compression cylinder having a discharge outlet, a piston reciprocable in said compression cylinder, said piston having a rearward extension of reduced diameter and said compression cylinder having a rearward tubular extension of reduced diameter into which the extension on said piston projects, said rearward tubular extension forming a continuation of said compression cylinder, said extensions providing a chamber therebetween forming a fluid seal for said compression cylinder of less diameter than the diameter of said piston whereby a pressure is created therein by the rearward extension of said piston during the return stroke of said piston, said fluid seal constituting a continuation of the chamber of said compression cylinder, and a fluid reservoir communicating with said seal.

3. In apparatus of the class described, the combination of a cylinder having a discharge outlet, a piston reciprocable in said cylinder, means for advancing said piston to create a pressure in said cylinder, a spring for returning said piston, a valve interposed between said outlet and said compression cylinder, a chamber of reduced diameter forming a continuation of said compression cylinder in rear of said piston, means providing a fluid connection between said chamber and that part of the compression cylinder in advance of the piston during the return stroke thereof, said piston being operable within said chamber to build up a fluid pressure therein during the return stroke of said piston, a fluid reservoir communicating with said chamber, and flow restricting means between said chamber and said reservoir.

4. In hydraulic pressure apparatus of the class described, a compression cylinder, a piston reciprocable therein for alternately creating superatmospheric pressure and subatmospheric pressure in said cylinder, means permitting flow of fluid past the piston in one direction only, a chamber forming a seal for preventing leakage of air past said piston during the return stroke thereof, a fluid reservoir, a single connection between said fluid reservoir and said seal, a second connection between said fluid reservoir and that part of said cylinder in front of said piston, and means including said piston and a valve in said first-mentioned connection for creating pressure in said fluid seal during the return stroke of said piston and for forcing fluid from said seal past said piston and into said compression cylinder.

5. In apparatus of the class described, the combination of a compression cylinder, a piston reciprocable therein, a fluid reservoir, a conduit in communication with said reservoir, a port connecting said conduit to that portion of said cylinder in front of the retracted position of said piston to permit return flow of fluid from said cylinder to said reservoir, a fluid chamber in rear of said piston, a second port connecting said chamber with said conduit whereby fluid may flow from said reservoir into said chamber, said first port being smaller than said second port, and valve means in said conduit openable to permit free flow from said reservoir through said conduit to said ports, said valve means including a part having a passageway therethrough of less diameter than said second port, said passageway limiting return flow of fluid from said second port to said reservoir.

6. In a device of the class described, the combination of a compression cylinder, a piston reciprocable therein, said piston having a rearward extension of reduced diameter, said compression cylinder having a rearward tubular extension of reduced diameter into which the extension on said piston projects, said rearward tubular extension constituting a continuation of the chamber formed by said compression cylinder, said extensions providing therebetween an annular chamber constituting a continuation of said cylinder and forming a fluid seal for said compression cylinder and being cooperable to build up a pressure in the fluid seal during the return stroke of the piston, a fluid reservoir, a single means of communication between said reservoir and said seal, and a flow restriction in said last-mentioned means.

7. In a hydraulic pressure system of the class described, the combination of a pair of interconnected different diametered cylinders, a pair of interconnected different diametered pistons reciprocable in said cylinders, the smaller of said pistons cooperating with the smaller of said cylinders to provide an annular chamber constituting a continuation of the chamber provided by the larger of said cylinders, means for reciprocating said pistons, a reservoir, a connection between said reservoir and each of said cylinders, and a restriction valve in the connection between said reservoir and the smaller of said cylinders permitting free flow from said reservoir to said cylinder and limited return flow through said connection.

8. In a fluid pressure mechanism, a cylinder, a piston reciprocable therein, a reservoir, means forming a passage between the reservoir and the cylinder, said passage being uncovered by the piston in its retracted position, a fluid containing chamber at the rear of the piston the volume of which varies with the piston movement, means forming a passage between the reservoir and the chamber, means permitting fluid to flow from said chamber past the piston on its return stroke, and valve means for said passages for allowing fluid to flow therethrough in one direction when the fluid pressure in that direction is a given value and in the other direction when the pressure in said direction is of lower value.

9. In a fluid pressure mechanism, a cylinder, a piston reciprocable therein, a reservoir, means forming a passage between the reservoir and the cylinder, said passage being uncovered by the piston in its retracted position, a fluid containing chamber at the rear of the piston the volume of which varies with the piston movement, means forming a passage between the reservoir and the chamber, means permitting fluid to flow from said chamber past the piston on its return stroke, and valve means for said passages for allowing fluid to flow from said reservoir therethrough at a predetermined pressure and in the opposite direction when the pressure in said direction is of greater value.

ERWIN F. LOWEKE.